(12) United States Patent
Lee et al.

(10) Patent No.: US 8,957,855 B2
(45) Date of Patent: Feb. 17, 2015

(54) METHOD FOR DISPLAYING A STEREOSCOPIC CURSOR AMONG STEREOSCOPIC OBJECTS

(75) Inventors: Hsin-Wei Lee, Shindian (TW); Yi-Chiun Hong, Danshui Township (TW)

(73) Assignee: Cyberlink Corp., Shindian, Taipei (TW)

( * ) Notice: Subject to any disclaimer, the term of this patent is extended or adjusted under 35 U.S.C. 154(b) by 481 days.

(21) Appl. No.: 13/532,037

(22) Filed: Jun. 25, 2012

(65) Prior Publication Data
US 2013/0342453 A1 Dec. 26, 2013

(51) Int. Cl.
*G06F 3/033* (2013.01)
*G09G 5/08* (2006.01)
*G09G 5/00* (2006.01)
*G06F 3/048* (2013.01)

(52) U.S. Cl.
USPC ........... 345/157; 345/156; 345/160; 715/757; 715/851

(58) Field of Classification Search
USPC .................. 345/156, 157, 160; 715/757, 851
See application file for complete search history.

(56) References Cited

U.S. PATENT DOCUMENTS

| | | | |
|---|---|---|---|
| 5,784,052 A | 7/1998 | Keyson | |
| 6,023,275 A | 2/2000 | Horvitz et al. | |
| 6,084,581 A | 7/2000 | Hunt | |
| 6,084,589 A | 7/2000 | Shima | |
| 6,166,718 A | 12/2000 | Takeda | |
| 6,918,087 B1 | 7/2005 | Gantt | |
| 7,178,111 B2 | 2/2007 | Glein et al. | |
| 7,735,018 B2 | 6/2010 | Bakhash | |
| 2002/0175911 A1 | 11/2002 | Light et al. | |
| 2006/0259863 A1 | 11/2006 | Obrador et al. | |
| 2006/0271691 A1 | 11/2006 | Jacobs et al. | |
| 2007/0271297 A1 | 11/2007 | Jaffe et al. | |
| 2007/0279435 A1 | 12/2007 | Ng et al. | |
| 2008/0010616 A1 | 1/2008 | Algreatly | |

(Continued)

FOREIGN PATENT DOCUMENTS

| WO | 2007113828 A2 | 10/2007 |
| WO | 2008048036 A1 | 4/2008 |
| WO | 2009122214 A2 | 10/2009 |

OTHER PUBLICATIONS

Azari et al., Sterio 3D Mouse Cursor: A Method for Interaction with 3D Objects in a Sterioscopic Virtual 3D Space, Hindawi Publishing Corporation, International Journal of Digital Multimedia Broadcasting, vol. 2010, Article ID 419493, 11 pages, Sep. 2009.

(Continued)

*Primary Examiner* — Aneeta Yodichkas
(74) *Attorney, Agent, or Firm* — McClure, Qualey & Rodack, LLP

(57) ABSTRACT

A stereoscopic cursor method comprising: generating a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and causing the stereoscopic cursor to move along the virtual plane responsive to viewer input, the movement occurring smoothly and gradually adjacent to the plural stereoscopic buttons and varying in depth as the stereoscopic cursor progresses along the virtual plane from one of the plural stereoscopic buttons to another, the generating and causing performed by a processor in a computing device.

21 Claims, 5 Drawing Sheets

(56) References Cited

U.S. PATENT DOCUMENTS

| | | |
|---|---|---|
| 2008/0094398 A1 | 4/2008 | Ng et al. |
| 2008/0168399 A1 | 7/2008 | Hetherington |
| 2009/0079731 A1 | 3/2009 | Fitzmaurice et al. |
| 2009/0140978 A1 | 6/2009 | Louch |
| 2009/0201289 A1 | 8/2009 | Kim et al. |
| 2009/0217209 A1 | 8/2009 | Chen et al. |
| 2010/0033429 A1 | 2/2010 | Olivan Bescos |
| 2010/0037178 A1 | 2/2010 | Queric |
| 2010/0127983 A1 | 5/2010 | Irani et al. |
| 2013/0314315 A1* | 11/2013 | Lee et al. .................. 345/157 |

OTHER PUBLICATIONS

N00bsify, How to get a Cursor Click effects No Downloads!, http://www.youtube.com/watch?v=EYkKkPnO9SE, Aug. 2010.

Nguyen-Thong Dang, A Survey and Classification of 3D Pointing Techniques, Research, Innovation and Vision for the Future, 2007 IEEE International Conference, Mar. 2007.

Grahamgrafx, 3D Cursor Environment, http://www.youtube.com/watch?v=HKD9f45ru3g&feature=related, Jan. 2010.

* cited by examiner

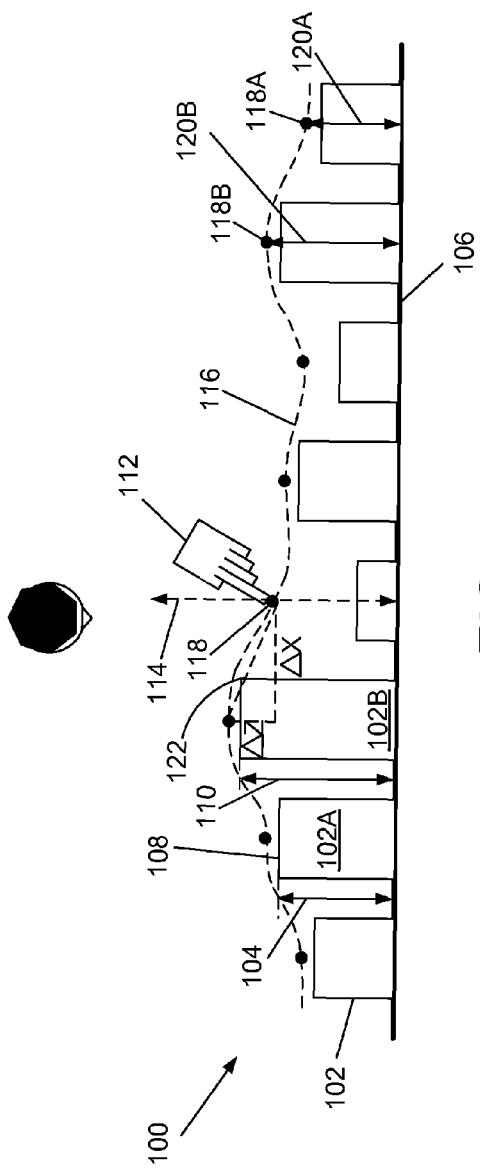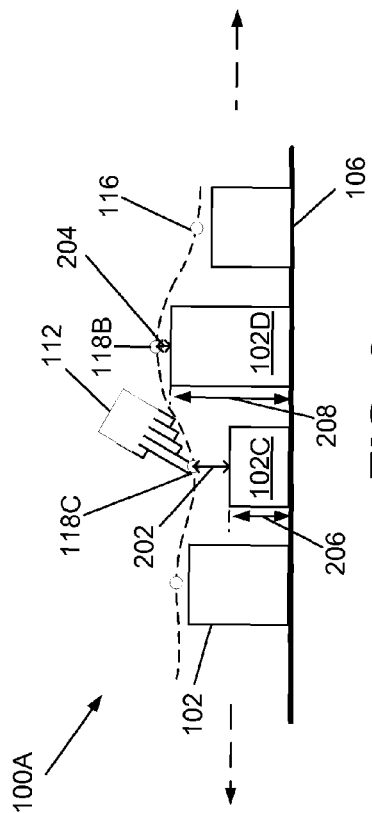

METHOD FOR DISPLAYING A STEREOSCOPIC CURSOR AMONG STEREOSCOPIC OBJECTS

TECHNICAL FIELD

The present disclosure is generally related to stereoscopic technology, and, more particularly, is related to user interaction with virtual objects in a stereoscopic user interface.

BACKGROUND

Stereoscopic technology (e.g., 3D) and devices have gained increasing popularity among users. For instance, many multimedia entertainment systems implement stereoscopic user interfaces to immerse the user in a more realistic user experience. Some example user interface tools to facilitate this stereoscopic effect include a stereoscopic cursor in conjunction with a stereoscopic user interface having virtual objects targeted by the stereoscopic cursor presented on a display device. However, some possible shortcomings to the use of cursors in existing stereoscopic systems range from dizzying effects a user may experience as a result of movements of the cursor to visual effects where the cursor appears external to the stereoscopic experience.

SUMMARY

In one embodiment, a stereoscopic cursor method comprising: generating a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and constraining navigation movement of the stereoscopic cursor among the plural stereoscopic buttons to the virtual plane, the navigation movement varying gradually in depth from one of the plural stereoscopic buttons to an adjacent other of the plural stereoscopic buttons, the generating and constraining performed by a processor in a computing device.

In another embodiment, a stereoscopic cursor method, the method comprising: generating a virtual plane for a stereoscopic user interface, the stereoscopic user interface comprising plural stereoscopic objects sharing a common base, the plural stereoscopic objects having different scene depths, wherein the virtual plane is positioned between a viewer and the plural stereoscopic objects; and causing navigation movement of a stereoscopic cursor from a first of the plural stereoscopic objects to a second of the plural stereoscopic objects adjacent to the first, the navigation movement constrained along the virtual plane, the navigation movement comprising a gradual change from a first cursor scene depth to a second cursor scene depth, the generating and causing performed by a processor in a computing device.

In another embodiment, a stereoscopic cursor method, the method comprising: generating a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and causing the stereoscopic cursor to move along the virtual plane responsive to viewer input, the movement occurring smoothly and gradually adjacent to the plural stereoscopic buttons and varying in depth as the stereoscopic cursor progresses along the virtual plane from one of the plural stereoscopic buttons to another, the generating and causing performed by a processor in a computing device.

In another embodiment, a stereoscopic cursor system comprising: a processor configured with logic to: generate a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and cause the stereoscopic cursor to move along the virtual plane responsive to viewer input, the movement occurring smoothly and gradually adjacent to the plural stereoscopic buttons and varying in depth as the stereoscopic cursor progresses along the virtual plane from one of the plural stereoscopic buttons to another.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a schematic diagram depicting an example embodiment of a stereoscopic user interface environment with plural stereoscopic buttons and a virtual plane for constraining navigation movement to smooth, gradual transitions across the plural stereoscopic buttons.

FIG. 2 is a schematic diagram that further illustrates a portion of a virtual plane and emphasizes an effect of the variable cursor scene depth on movement of a stereoscopic cursor.

DETAILED DESCRIPTION

Figure 3:
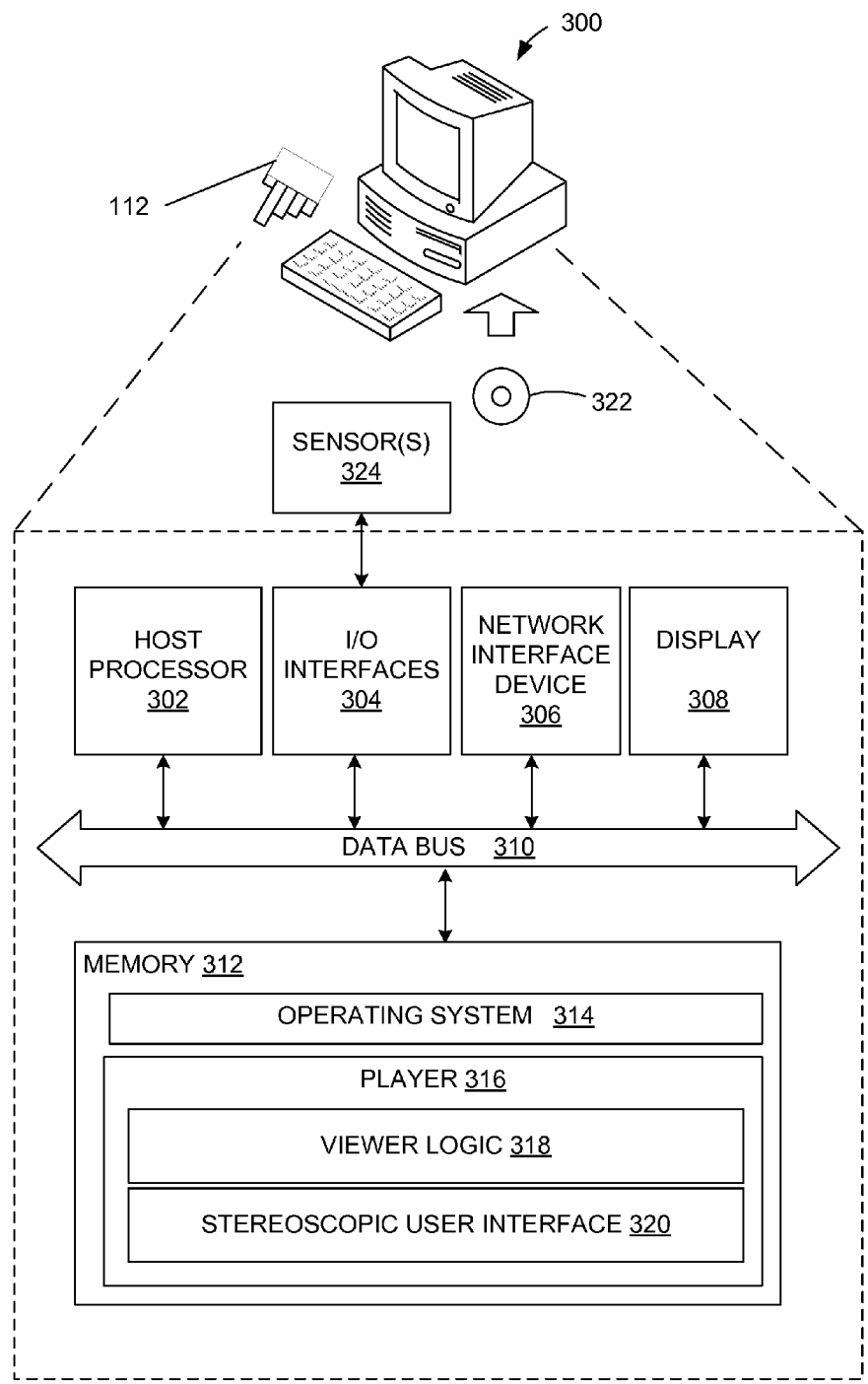
FIG. 3 is a block diagram of an example embodiment of a stereoscopic cursor system.

Disclosed herein are certain embodiments of an invention that comprises a stereoscopic cursor system and method that enables a viewer to have a more realistic and enjoyable interaction experience when using a stereoscopic cursor in a stereoscopic user interface environment. In one embodiment, a stereoscopic cursor system generates a virtual plane that constrains navigation movement (e.g., movement among plural stereoscopic objects prior to selection of a given stereoscopic object in the environment) of the stereoscopic cursor to vertices on the virtual plane in a smooth and gradual manner. Each vertex of the virtual plane comprises a cursor scene depth (e.g., distance along a depth axis from a given virtual plane vertex to a base edge shared by plural stereoscopic objects, such as plural stereoscopic buttons) that differs when compared across different stereoscopic objects (e.g., stereoscopic buttons, windows, etc.). For instance, where a first vertex of the virtual plane shares a first depth axis with a first stereoscopic button of a first scene depth, and a second vertex of the virtual plane shares a second depth axis with a second stereoscopic button (of a second scene depth) adjacent to the first stereoscopic button, the cursor scene depths of the first and second vertices are different. Stated differently, as the stereoscopic cursor moves from one stereoscopic button to the next, the cursor scene depth along a surface of the virtual plane changes in a smooth and gradual manner.

In contrast, some existing systems may remain on a fixed plane or depict transitions by changes in cursor size that are abrupt, often providing a perception that is lacking in stereoscopic feeling and/or causing dizziness or other ill feelings due to the abruptness and intensity of the change.

Having broadly summarized certain features of stereoscopic cursor systems and methods of the present disclosure, reference will now be made in detail to the description of the disclosure as illustrated in the drawings. While the disclosure is described in connection with these drawings, there is no intent to limit the disclosure to the embodiment or embodiments disclosed herein. For instance, though described using stereoscopic button icons (e.g., herein, referred to as stereoscopic buttons) as an example of stereoscopic objects in a stereoscopic user interface environment created in a computing device, it should be understood within the context of the present disclosure that other stereoscopic objects in the same or different displayed orientation may be presented in similar or different stereoscopic environments, and hence are contemplated to be within the scope of the disclosure. Although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example stereoscopic user interface 100 that is presented to a viewer (depicted by the head with dark hair located toward the top of FIG. 1), such as on a display screen of a computing system or device (including, in some embodiments, a head mounted display such as in an immersive virtual environment). The stereoscopic user interface 100 is shown in a plan view (e.g., overhead view). The stereoscopic user interface 100 may comprise plural stereoscopic objects, such as stereoscopic buttons 102 (e.g., 102A, 102B, etc.). It should be appreciated that other types of virtual objects may be presented in the stereoscopic user interface 100. In the example depicted in FIG. 1, the stereoscopic buttons 102 each have a respective scene depth. For instance, for stereoscopic button 102A, the scene depth 104 is based on the depth distance between a base edge 106 common to all of the plural stereoscopic buttons 102 and a surface 108 (e.g., facing the viewer) at an opposing end of the button 102A. In one embodiment, the scene depths among all, or at least a portion, of the plural stereoscopic buttons 102 are different. For instance, the scene depth 104 for stereoscopic button 102A is different than the scene depth 110 of stereoscopic button 102B.

In addition, a computing system or device for generating the stereoscopic user interface 100 may have one or more sensors coupled thereto for detecting and tracking an input device and its corresponding movement, as is known. The input device may be a body part of a viewer, such as a hand or arm, or other input devices associated with a body part (e.g., held by a viewer's hand, such as a mouse, pointing device, etc., or otherwise affixed to the viewer's body). The input device used herein for illustration is a viewer's hand, with the understanding that other input devices are contemplated to be within the scope of the disclosure. In the example stereoscopic user interface 100 depicted in FIG. 1, the viewer's hand is represented in virtual space as a stereoscopic cursor 112. Though shown as a "hand," the cursor 112 may be represented with other types of graphics or icons, such icons representing the input device in virtual space. A viewer may navigate the stereoscopic cursor 112 via navigation movement (e.g., input device movement) in one or more directions to position the stereoscopic cursor 112 in a position that enables the viewer to select one of the plural stereoscopic buttons 102, the selection occurring in a direction (e.g., depth direction, such as along a depth or z-axis 114) that is different than the stereoscopic cursor navigation movement prior to selection (e.g., orthogonal or transverse to the navigation movement, or in some embodiments, angled relative to the navigation movement).

In one embodiment, the stereoscopic cursor 112 has a navigation movement that is constrained by a virtual plane 116 (shown as a dashed edge or line, with the understanding that the edge extends out of and into the page). Stereoscopic cursor navigation movement (and button selection) may occur anywhere within the height (e.g., fixed height or variable height that allows more viewer movement freedom) of the stereoscopic buttons 102 along the virtual plane 116, or in some embodiments, navigation may occur beyond the height boundaries of the stereoscopic buttons 102 along the virtual plane 116, or in some embodiments (e.g., with different height buttons 102), navigation and selection may be constrained in height by one of the buttons 102 (e.g., the shortest button 102) or some offset from (e.g., below) the height of one of the buttons 102. The virtual plane 116 comprises a plurality of vertices, such as vertex 118. Vertices are generally referred to herein with reference number 118, except where a suffix (e.g., A, B) is added to distinguish one vertex from another. It should be appreciated, within the context of the present disclosure, that though a vertex 118 is shown in front of (e.g., actually appears as "above" in FIG. 1) a respective stereoscopic button 102, such as along a depth axis (e.g., depth axis 114), the virtual plane 116 may comprise additional vertices in some embodiments. In one embodiment, the virtual plane 116 comprises cursor scene depths that vary among the vertices 118 as the stereoscopic cursor 112 is navigated across the stereoscopic buttons 102. For instance, a cursor scene depth 120A (e.g., a distance spanning between the virtual plane 116 and the base 106 for a given depth axis) for vertex 118A on virtual plane 116 is different than the cursor scene depth 120B for vertex 118B. In other words, as the viewer navigates the stereoscopic cursor 112 along virtual plane 116 between vertices 118A and 118B, the cursor scene depths 120A and 120B change (e.g., have different values). Note that cursor scene depths are generally denoted herein as cursor scene depth 120.

The virtual plane 116 is generated by determining the scene depths (e.g., 104, 110, etc.) of each of the stereoscopic buttons 102 and the cursor scene depths 120. For instance, the virtual plane 116 may be computed (e.g., calculated) by logic in the stereoscopic cursor system by implementing a subsampling algorithm based on the relationship between the stereoscopic buttons 102. The subsampling algorithm implemented may be one of a plurality of known subsampling algorithms, including nearest neighbor interpolation, bi-linear interpolation, bi-cubic interpolation, simple random sampling, stratified sampling, among others. The virtual plane 116 ensures a gradual transition in cursor scene depth 120 (and hence a smooth, gradual movement of the cursor 112 along the virtual plane 116). A slope 122 (e.g., ΔZ/ΔX) between adjacent vertices does not equal or exceed (or just exceed in some embodiments) a predetermined threshold (e.g., value). In other words, the slope between adjacent vertices 118 is less than a predetermined value to ensure gradual, smooth transitions in the stereoscopic cursor movement as there is navigation from one stereoscopic button 120 to the next. In one embodiment, each vertex 118 of the virtual plane 116 may be determined by finding a vertex on each surface (e.g., surface 108) of the buttons 102 (e.g., along a depth axis), generating the virtual plane 116 via implementation of a subsampling algorithm, and finding a vertex 118 on the virtual plane 116 according to the virtual plane 116 and the first vertex on each surface of the buttons 102.

Referring to FIG. 2, shown is a portion 100A of the stereoscopic user interface 100 shown in FIG. 1 that illustrates how the different cursor scene depth changes may affect the perception of stereoscopic movement along the depth axis, such as depth axis 114 (FIG. 1). Note that the vertices 118 (e.g., 118B, 118C) are shown with "white" fill in FIG. 2 (as opposed to dark fill as shown in FIG. 1) to avoid obscuring double headed arrows 202 and 204 located between vertices 118C and 118B and stereoscopic buttons 102C and 102D, respectively. The double headed arrow 202 denotes a depth distance (e.g., coincident with a depth axis running perpendicular to the base 106 from the viewer's perspective) between the vertex 118C on the virtual plane 116 and a corresponding surface (e.g., facing the viewer) of the stereoscopic button 102C. Similarly, the double headed arrow 204 denotes a depth distance (e.g., coincident with a depth axis running perpendicular to the base 106 from the viewer's perspective) between the vertex 118B on the virtual plane 116 and a corresponding surface of the stereoscopic button 102D. As noted, the depth distance 202 that the stereoscopic cursor 112 has to move along the depth axis (from the vertex 118C) to select (e.g., "contact," or in some embodiments, extend beyond, a surface of the stereoscopic button) the stereoscopic button 102C is greater than the depth distance 204 the stereoscopic cursor 112 needs to move along the depth axis to select the stereoscopic button 102D. This difference in depth the stereoscopic cursor 112 has to move to make a selection of one stereoscopic button 102D versus another (e.g., adjacent button, though the depth difference may arise from selection of other, non-adjacent stereoscopic buttons 102) stereoscopic button 102C arises from the fact that the cursor scene depths 120 are calculated to ensure no abrupt changes in navigation movement between stereoscopic buttons 102, where the calculation accounts for (e.g., considers) the relationship of the stereoscopic buttons 102, such as the difference in scene depths 206 and 208 of the stereoscopic buttons 102C and 102D, respectively.

It should be appreciated, within the context of the present disclosure, that the speed of movement along the virtual plane 116 (and between the stereoscopic buttons 102) may be linear or non-linear, with the constraint of navigational movement along the virtual plane 116 maintaining the transitions between the stereoscopic buttons 102 without violations of the predetermined slope constraints.

Having described an example operation of certain embodiments of a stereoscopic cursor system, attention is directed to FIG. 3, which illustrates an embodiment of a stereoscopic cursor system 300. The stereoscopic cursor system 300 may be embodied in the entirety of the system depicted in FIG. 3, or a subset thereof in some embodiments. The example stereoscopic cursor system 300 is shown as a computer (e.g., a computing system or device), though it should be appreciated within the context of the present disclosure that the stereoscopic cursor system 300 may comprise any one of a plurality of computing devices, including a dedicated player appliance, set-top box, laptop, computer workstation, cellular phone, personal digital assistant (PDA), handheld or pen based computer, embedded appliance, or other communication (wired or wireless) device that is coupled to, or integrated with, a disc drive (e.g., optical disc drive, magnetic disc drive, etc.) for enabling playback of multimedia content from a computer readable medium. In some embodiments, the stereoscopic cursor system 300 may be implemented on a network device located upstream of the system 300, such as a server, router, etc., or implemented with similar functionality distributed among plural devices (e.g., in a server device and the computing device). An upstream network device may be configured with similar components, and hence discussion of the same is omitted for brevity.

The stereoscopic cursor system 300 may, for instance, comprise one or more processors, such as a host processor 302, one or more input/output interfaces 304 (I/O interfaces), a network interface device 306, and a display 308 connected across a data bus 310. The stereoscopic cursor system 300 may further comprise a memory 312 that includes an operating system 314 and application specific software, such as a player application 316 (or also, referred to herein as player logic or player). The player application 316 comprises, among other logic (e.g., software), viewer logic 318 and stereoscopic user interface logic 320. The viewer logic 318 may be implemented as a software program configured to read and play back content residing on a disc 322 (or from other high definition video sources) according to the specifications defined by standards such as the Blu-ray Disc format specification, HD-DVD, etc. In one example operation, once the disc 322 or other video source is received by the viewer logic 318, the viewer logic 318 can execute and/or render one or more user interactive (interaction) programs residing on the disc 322 or provided by the source.

An example user interactive program can include, but is not limited to, a movie introductory menu or other menus, control panel, dialog box (in stereoscopic format, or converted thereto by conversion logic associated with, or embedded in, the player logic 316), and user interactive features allowing a user to enhance, configure, and/or alter the viewing experience, choose playback configuration options, select chapters to view within the disc 322, in-movie user interactive features, games, or other features as should be appreciated. The stereoscopic user interface logic 320 is configured to generate a virtual environment, and present the stereoscopic user interface 100 representing the virtual environment on the display 308. Further, the stereoscopic user interface logic 320 is configured to receive movement information, such as detected by one or more sensors 324 coupled to, or in some embodiments integrated with, the computing device via the I/O interfaces 304. The sensing or detecting by the sensors 324 of hand movement (or movement of other input devices) may be implemented using any one or variety of known sensing techniques, including ultrasound, infrared, etc. The stereoscopic user interface logic 320 is configured to represent the input device (e.g., the viewer's hand, though other input devices are contemplated such as a keyboard, pointing device, etc.) as the stereoscopic cursor 112 for presentation in the stereoscopic user interface 100. The stereoscopic user interface logic 320 is further configured with logic to compute the virtual plane 116 and all the associated calculations, including the various scene depths (e.g., button scene depth, cursor scene depth), subsampling implementations, slope constraints, etc. Further, the stereoscopic user interface logic 320 is configured to present various animation effects in the stereoscopic user interface 100, such as depth change movements, press-button animation, etc. Note that the player logic 316 may also be implemented, in whole or in part, as a software program residing in mass storage, the disc 322, a network location, or other locations, as should be appreciated by one having ordinary skill in the art.

The host processor 302 may include any custom made or commercially available processor, a central processing unit (CPU) or an auxiliary processor among several processors associated with the stereoscopic cursor system 300, a semiconductor based microprocessor (e.g., in the form of a microchip), one or more ASICs, a plurality of suitably configured digital logic gates, and other well-known electrical configurations comprising discrete elements both individually and in various combinations to coordinate the overall operation of the computing device.

The memory 312 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises the native operating system 314, one or more native applications, emulation systems, or emulated applications for any of a variety of operating systems and/or emulated hardware platforms, emulated operating systems, etc. For example, the applications may include application specific software stored on a computer readable medium for execution by the host processor 302 and may include the player application 316 and its corresponding constituent components (e.g., 318, 320). In some embodiments, the stereoscopic user interface logic 320 and/or viewer logic 318 may be separate from the player application 316. One of ordinary skill in the art will appreciate that the memory 312 may, and typically will, comprise other components which have been omitted for purposes of brevity.

Input/output interfaces 304 provide any number of interfaces for the input and output of data. For example, where the stereoscopic cursor system 300 comprises a personal computer, these components may interface with a user input device, which may be a body part of a viewer (e.g., hand, arm, etc.), keyboard, a mouse, or voice activated mechanism. Where the stereoscopic cursor system 300 comprises a handheld device (e.g., PDA, mobile telephone), these components may interface with function keys or buttons, a touch sensitive screen, a stylus, body part, etc. The input/output interfaces 304 may further include one or more disc drives (e.g., optical disc drives, magnetic disc drives) to enable playback of multimedia content residing on the computer readable medium 322, and as explained above, may interface with the sensor(s) 324.

The network interface device 306 comprises various components used to transmit and/or receive data over a network environment. By way of example, the network interface device 306 may include a device that can communicate with both inputs and outputs, for instance, a modulator/demodulator (e.g., a modem), wireless (e.g., radio frequency (RF)) transceiver, a telephonic interface, a bridge, a router, network card, etc. The stereoscopic cursor system 300 may further comprise mass storage (not shown). For some embodiments, the mass storage may include a data structure (e.g., database) to store and manage data. Such data may comprise, for example, editing files which specify special effects for a particular movie title.

The display 308 may comprise a computer monitor or a plasma screen for a PC or a liquid crystal display (LCD) on a hand held device, head-mount device, television, or other computing device. In some embodiments, the display 308 may be separate from the stereoscopic cursor system 300, and in some embodiments, integrated in the computing device.

In the context of this disclosure, a "computer-readable medium" stores one or more programs and data for use by or in connection with the instruction execution system, apparatus, or device. The computer readable medium is non-transitory, and may be, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

Figure 4:
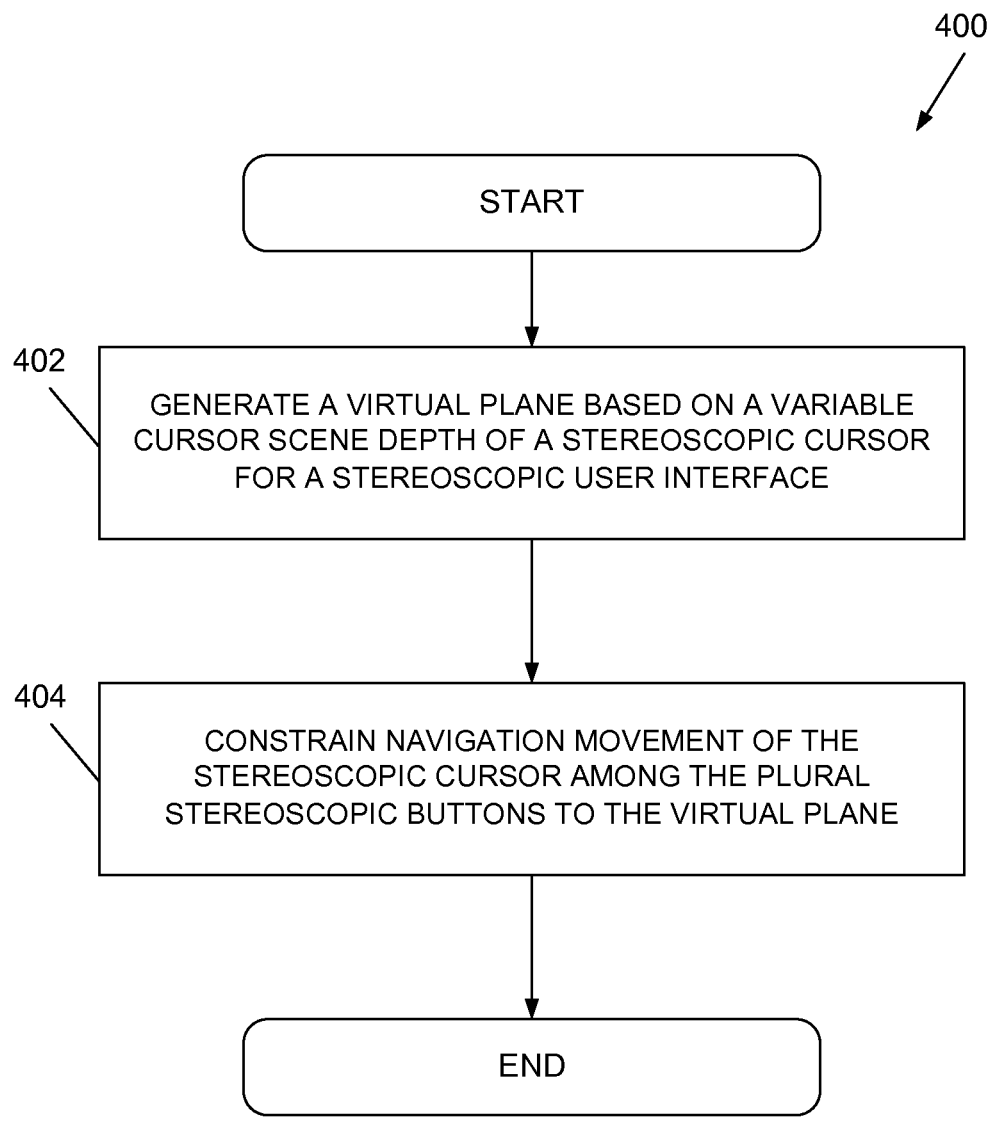
FIG. 4 is a flow diagram of an example embodiment of a stereoscopic cursor method.

Having provided a detailed description of certain embodiments of stereoscopic cursor systems and methods, it should be appreciated that one embodiment of a stereoscopic cursor method 400, implemented by the stereoscopic cursor system 300 and depicted in FIG. 4, comprises generating a virtual plane based on a variable cursor scene depth of a stereoscopic cursor for a stereoscopic user interface (402). For instance, the stereoscopic user interface comprises plural stereoscopic buttons, wherein the virtual plane is positioned between a viewer and the plural stereoscopic buttons. As noted above, the variable cursor scene depth avoids any abrupt changes as the viewer navigates from one stereoscopic button to the next. The method 400 further comprises constraining navigation movement of the stereoscopic cursor among the plural stereoscopic buttons to the virtual plane (404). Accordingly, the navigation movement varies gradually in depth from one of the plural stereoscopic buttons to an adjacent other of the plural stereoscopic buttons.

Figure 5:
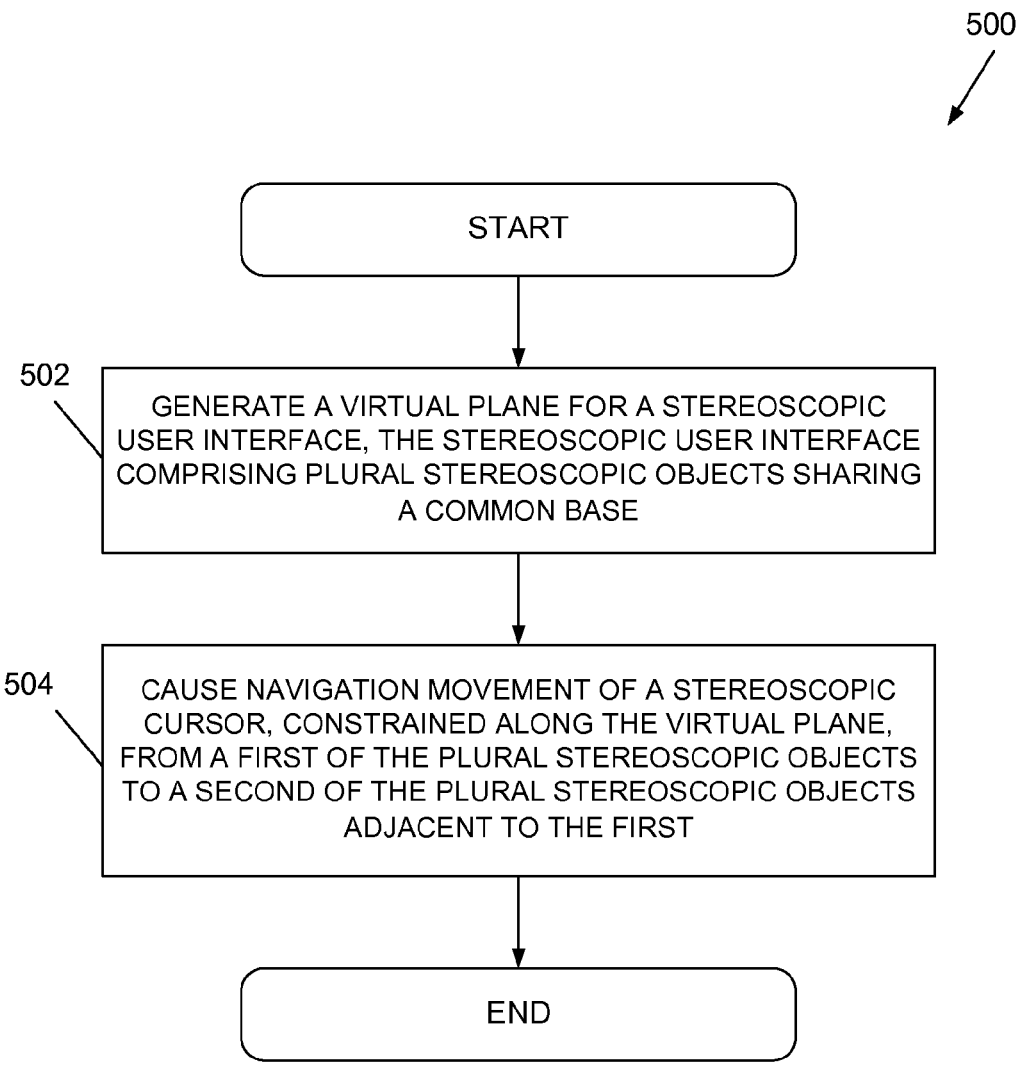
FIG. 5 is a flow diagram of another example embodiment of a stereoscopic cursor method.

In view of the foregoing disclosure, it should be appreciated that another embodiment of a stereoscopic cursor method 500, implemented by the stereoscopic cursor system 300 and depicted in FIG. 5, comprises generating a virtual plane for a stereoscopic user interface, the stereoscopic user interface comprising plural stereoscopic objects sharing a common base (502). The plural stereoscopic objects have different scene depths, wherein the virtual plane is positioned between a viewer and the plural stereoscopic objects. For instance, the common base comprises the base 106 shown in FIG. 1. Example objects include various virtual icons (e.g., stereoscopic buttons, stereoscopic dials, stereoscopic levers, and/or other stereoscopic objects that are selectable to cause one or more functions to be activated), windows, among other virtual objects. The method 500 further comprises causing navigation movement of a stereoscopic cursor from a first of the plural stereoscopic objects to a second of the plural stereoscopic objects adjacent to the first, the navigation movement constrained along the virtual plane (504). Accordingly, the navigation movement comprises a gradual change from a first cursor scene depth to a second cursor scene depth.

Figure 6:
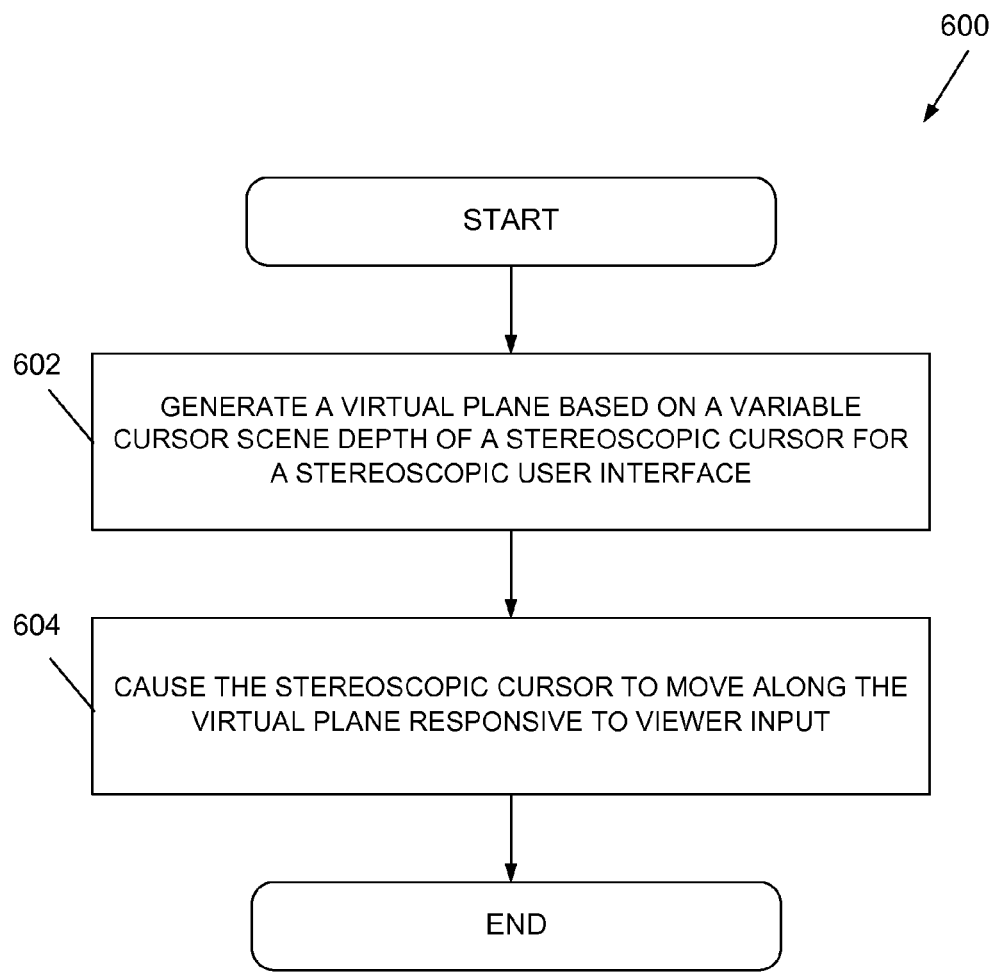
FIG. 6 is a flow diagram of another example embodiment of a stereoscopic cursor method.

In view of the foregoing disclosure, it should be appreciated that another embodiment of a stereoscopic cursor method 600, implemented by the stereoscopic cursor system 300 and depicted in FIG. 6, comprises generating a virtual plane based on a variable cursor scene depth of a stereoscopic cursor for a stereoscopic user interface (602). For instance, the stereoscopic user interface comprises plural stereoscopic buttons, wherein the virtual plane is positioned between a viewer and the plural stereoscopic buttons. The method 600 further comprises causing the stereoscopic cursor to move along the virtual plane responsive to viewer input (604). Accordingly, the movement occurs smoothly and gradually adjacent to the plural stereoscopic buttons and varies in depth as the stereoscopic cursor progresses along the virtual plane from one of the plural stereoscopic buttons to another.

Any process descriptions or blocks in flow diagrams should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, and/or with one or more functions omitted in some embodiments, depending on the functionality involved, as would be understood by those reasonably skilled in the art of the present disclosure. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of certain stereoscopic cursor systems, it should be understood that not every embodiment necessarily provides every benefit/advantage.

In addition, the scope of certain embodiments of the present disclosure includes embodying the functionality of certain embodiments of a stereoscopic cursor system 300 in logic embodied in hardware and/or software-configured mediums. For instance, though described in software configured mediums, it should be appreciated that one or more of the stereoscopic cursor system and method functionality described herein may be implemented in hardware or a combination of both hardware and software.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A stereoscopic cursor method, the method comprising:
generating a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and
constraining navigation movement of the stereoscopic cursor among the plural stereoscopic buttons to the virtual plane, the navigation movement varying gradually in depth from one of the plural stereoscopic buttons to an adjacent other of the plural stereoscopic buttons, the generating and constraining performed by a processor in a computing device.

2. The method of claim 1, wherein a slope between a first vertex and a second vertex on the virtual plane is less than a predetermined value, the first and second vertices corresponding to the one and the other of the plural stereoscopic buttons, respectively.

3. The method of claim 2, wherein during the navigation movement, a first distance between the virtual plane and the one of the stereoscopic buttons is different than a second distance between the virtual plane and the other of the stereoscopic buttons.

4. The method of claim 3, wherein the difference in distance is based on maintaining the slope less than the predetermined value, the first and second differences measured from a like location on a surface of the respective one and other stereoscopic buttons.

5. The method of claim 1, wherein generating the virtual plane comprises implementing a subsampling algorithm.

6. The method of claim 5, wherein each adjacent vertex of plural vertices of the virtual plane is separated from a surface of the corresponding stereoscopic button of the plural stereoscopic buttons, the surface opposing the viewer, the separation comprising a depth difference that is less than a predetermined threshold.

7. The method of claim 5, wherein a speed of the navigation movement between adjacent vertices of the plural vertices is linear or non-linear.

8. The method of claim 1, further comprising causing movement of the stereoscopic cursor from a vertex of the virtual plane to a selected button of the plural stereoscopic buttons responsive to selection by the viewer, the selection movement angled relative to the navigation movement and along a depth axis shared by the vertex and the selected button.

9. The method of claim 1, further comprising providing an animation on a display screen of the stereoscopic cursor, the plural stereoscopic buttons, and the navigation movement.

10. A stereoscopic cursor method, the method comprising:
generating a virtual plane for a stereoscopic user interface, the stereoscopic user interface comprising plural stereoscopic objects sharing a common base, the plural stereoscopic objects having different scene depths, wherein the virtual plane is positioned between a viewer and the plural stereoscopic objects; and
causing navigation movement of a stereoscopic cursor from a first of the plural stereoscopic objects to a second of the plural stereoscopic objects adjacent to the first, the navigation movement constrained along the virtual plane, the navigation movement comprising a gradual change from a first cursor scene depth to a second cursor scene depth, the generating and causing performed by a processor in a computing device.

11. The method of claim 10, wherein the first and second cursor scene depths each comprise a distance between the base and an associated vertex located on the virtual plane.

12. The method of claim 10, wherein a slope between a first vertex and a second vertex on the virtual plane is less than a predetermined value, the first and second vertices corresponding to the first and second of the plural stereoscopic objects, respectively.

13. The method of claim 12, wherein the difference in distance is based on maintaining the slope less than the predetermined value, the first and second difference measured from a surface of the respective first and second stereoscopic objects.

14. The method of claim 10, wherein generating the virtual plane comprises implementing a subsampling algorithm.

15. The method of claim 14, wherein each adjacent vertex of plural vertices of the virtual plane is separated from a surface of the corresponding stereoscopic button of the plural stereoscopic buttons, the surface opposing the viewer, the separation comprising a depth difference that is less than a predetermined threshold.

16. The method of claim 14, wherein a speed of the navigation movement between adjacent vertices of the plural vertices is linear or non-linear.

17. The method of claim 10, further comprising causing movement of the stereoscopic cursor from a vertex of the virtual plane to one of the plural stereoscopic objects responsive to selection of the one of the plural stereoscopic objects by the viewer, the selection movement angled relative to the navigation movement and along a depth axis shared by the vertex and the one of the plural stereoscopic objects.

18. The method of claim 10, further comprising providing an animation on a display screen of the stereoscopic cursor, the plural stereoscopic objects, and the navigation movement.

19. The method of claim 10, wherein navigation movement between all of the plural stereoscopic buttons is gradual, smooth, and based on input device movement.

20. A stereoscopic cursor method, the method comprising:
   generating a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and
   causing the stereoscopic cursor to move along the virtual plane responsive to viewer input, the movement occurring smoothly and gradually adjacent to the plural stereoscopic buttons and varying in depth as the stereoscopic cursor progresses along the virtual plane from one of the plural stereoscopic buttons to another, the generating and causing performed by a processor in a computing device.

21. A stereoscopic cursor system comprising:

a processor configured with logic to:
   generate a virtual plane based on a variable cursor scene depth of a stereoscopic cursor for a stereoscopic user interface, the stereoscopic user interface comprising plural stereoscopic buttons, wherein the virtual plane is positioned between a viewer and the plural stereoscopic buttons; and
   cause the stereoscopic cursor to move along the virtual plane responsive to viewer input, the movement occurring smoothly and gradually adjacent to the plural stereoscopic buttons and varying in depth as the stereoscopic cursor progresses along the virtual plane from one of the plural stereoscopic buttons to another.

* * * * *